United States Patent
Zhang et al.

(10) Patent No.: US 10,124,736 B2
(45) Date of Patent: Nov. 13, 2018

(54) ARTICLE STORAGE DEVICE IN A VEHICLE

(71) Applicant: Ford Global Technologies, LLC, Dearborn, MI (US)

(72) Inventors: Jason Zhang, Nanjing (CN); Phil Qi, Nanjing (CN); Peter Zhang, Nanjing (CN); Wei Xu, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/581,797

(22) Filed: Apr. 28, 2017

(65) Prior Publication Data

US 2017/0320442 A1    Nov. 9, 2017

(30) Foreign Application Priority Data

May 9, 2016   (CN) .................... 2016 2 0414058 U (51) Int. Cl.
   *B60N 3/10* (2006.01)
   *B60R 7/04* (2006.01)
   *B60R 11/00* (2006.01)

(52) U.S. Cl.
   CPC .............. *B60R 7/04* (2013.01); *B60N 3/102* (2013.01); *B60R 2011/0007* (2013.01)

(58) Field of Classification Search
   CPC ..... B60R 7/00; B60R 7/04; B60R 2011/0007; B60N 3/102
   USPC ............... 224/539, 542; 296/24.34
   See application file for complete search history.

(56) References Cited

U.S. PATENT DOCUMENTS

| | | | | |
|---|---|---|---|---|
| 2,175,949 A | * | 10/1939 | Allen | B65D 25/06 190/28 |
| 4,261,465 A | * | 4/1981 | Thomas | B65D 25/06 206/708 |
| 4,964,528 A | * | 10/1990 | Wagoner | B65D 25/06 220/541 |
| 5,322,021 A | | 6/1994 | Jackson | |
| 5,520,313 A | * | 5/1996 | Toshihide | B60N 3/102 224/539 |
| 5,584,412 A | * | 12/1996 | Wang | B60R 7/02 220/500 |
| 5,720,514 A | | 2/1998 | Carlsen et al. | |
| 6,056,177 A | * | 5/2000 | Schneider | B60R 5/04 220/4.28 |

(Continued)

FOREIGN PATENT DOCUMENTS

WO   2005061271 A2   7/2005
WO   2013000763 A1   1/2013

OTHER PUBLICATIONS

"Center Console Organizer Installation", May 27, 2012, https://www.youtube.com/watch?v=Ej1I2fry5ms.

(Continued)

*Primary Examiner* — Justin Larson
(74) *Attorney, Agent, or Firm* — Alice Xu; Mohr IP Law Solutions, PC (57) ABSTRACT

An article storage device comprises a housing having a storage space defined by a bottom and a plurality of sidewalls; and a partition plate extending between two opposing sidewalls of the housing, perpendicular to a bottom of the housing, and dividing the storage space into a plurality of compartments. The partition plate is pivotably coupled to the opposing sidewalls of the housing via a pivot.

15 Claims, 4 Drawing Sheets

(56) References Cited

U.S. PATENT DOCUMENTS

| | | | |
|---|---|---|---|
| 6,254,162 B1 * | 7/2001 | Faber | B60P 7/0892 224/497 |
| 6,308,873 B1 * | 10/2001 | Baldas | B60R 7/02 217/15 |
| 6,488,168 B1 * | 12/2002 | Wang | B60R 7/02 220/6 |
| 6,508,508 B1 | 1/2003 | Bargiel | |
| 6,520,364 B2 * | 2/2003 | Spykerman | B60R 7/02 220/6 |
| 7,240,814 B2 * | 7/2007 | Holmberg | B60R 7/005 220/529 |
| 7,401,716 B2 * | 7/2008 | Svenson | B60R 5/045 224/42.32 |
| 7,726,502 B2 * | 6/2010 | Apps | B65D 21/0224 220/4.28 |
| 7,794,000 B2 * | 9/2010 | Ichimaru | B60R 7/04 248/311.2 |
| 8,205,763 B2 * | 6/2012 | Fredrickson | B65D 11/1833 220/4.28 |
| 8,215,693 B2 * | 7/2012 | Ulita | B60R 7/02 296/37.1 |
| 8,276,964 B2 | 10/2012 | Werner et al. | |
| 9,771,026 B2 * | 9/2017 | Xu | B60R 7/04 |
| 2003/0000982 A1 * | 1/2003 | Gehring | B60R 7/02 224/539 |
| 2006/0011686 A1 * | 1/2006 | Latham | B60R 7/04 224/579 |
| 2007/0194071 A1 * | 8/2007 | Hollinger | B60R 7/00 224/542 |
| 2015/0151661 A1 * | 6/2015 | Morel | B60R 7/04 296/37.1 |
| 2016/0159288 A1 * | 6/2016 | Ito | B60R 5/04 224/542 |
| 2017/0320442 A1 * | 11/2017 | Zhang | B60R 7/04 |
| 2018/0126919 A1 * | 5/2018 | Huebner | B60R 11/02 |

OTHER PUBLICATIONS

"Center Console Box", http://www.subarumanuals.org/subaru-709.html.

Yukon Accessories https://web.archive.org/web/20160116010605/https://www.gmc.com/yukon-full-size-suv/accessories.html.

\* cited by examiner

ARTICLE STORAGE DEVICE IN A VEHICLE

RELATED APPLICATION

This application claims the benefit of Chinese Patent Application No.: CN 201620414058.5 filed on May 9, 2016, the entire contents thereof being incorporated herein by reference.

FIELD

The present invention relates to an article storage device in a vehicle, in particular, relates to an article storage device that provides adjustable compartments to store articles.

BACKGROUND

A user of a vehicle usually stores small articles such as a cell phone charger, an ear phone cord, a GPS cable, keys in a storage bin or a compartment of a central console or under an armrest. The conventional storage devices, however, usually have one integrated storage space and the small articles are mingled in the integrated space, which may cause the cables and cords intertwined and thus makes it difficult to separate or difficult to find the needed items quickly.

There exist storage devices which divide the integrated storage space into a plurality of compartments. In some of these storage devices, however, the storage space is divided into several small compartments permanently and cannot be returned to the original big storage space when there is need for storing a large item. Some storage devices divide the storage space into several levels parallel with a bottom of the storage device, which can result in difficult to take out the items stored at the low level. In some storage device, the storage spaces are divided into several small compartments with vertical dividers and the dividers are inserted into the designated places of the storage space one by one manually and thus cannot separate the storage space into a plurality of compartments or change the storage space configurations quickly and conveniently. Further, the dividers are not easy to be stored when not in use.

Thus, there is a need for an article storage device that can divide a storage space into a plurality of compartments to receive small items in categories in a convenient manner.

SUMMARY OF INVENTION

According to one aspect, an article storage device in a vehicle is provided. The article storage device comprises a housing having a storage space defined by a bottom and a plurality of sidewalls; and a partition plate extending between two opposing sidewalls of the housing, perpendicular to a bottom of the housing, and dividing the storage space into a plurality of compartments. The partition plate is pivotably coupled to the opposing sidewalls via a pivot.

In one embodiment, each of the opposing sidewalls of the housing has a pivot hole to receive a pivot connected to a fixed side of the partition plate, and an arc track with a center at the pivot hole. The fixed side of the partition plate is connected to the two opposing sidewalls via the pivot, and two ends of a free side of the partition plate are slidably connected to the two opposing sidewalls via the arc track.

In another embodiment, the article storage device further comprising two fixed plates detachably connected to the two opposing sidewalls. Each of the fixed plate includes a pivot hole to receive a pivot connected to a fixed side of the partition plate, and an arc track with a center at the pivot hole. The fixed side of the partition plate is fixed to the two fixed plates via the pivot, and two ends of a free side of the partition plate are slidably connected to the two fixed plates via the arc tracks.

In another embodiment, one of the two opposing sidewalls include a protrusion toward the storage space, and each of the fixed plates includes a vertical groove corresponding to the protrusion, and wherein the two fixed plates are connected to the two opposing sidewalls when the protrusion is received in the vertical groove.

In another embodiment, the arc track has a first end adjacent to a top of the storage space. Each of the fixed plates includes a first recess positioned under the first end and connected with the first end and a second recess positioned under the pivot hole and connected with the pivot hole.

In another embodiment, the partition plate includes a first partition plate and a second partition plate parallel and spaced apart each other, and a third partition plate detachably connected to the first and second partition plates. The third partition plate is substantially perpendicular to the first and second partition plates at a use position.

In another embodiment, one end of the third partition plate is pivotably connected to the first partition plate, and another opposite side is detachably connected to the second partition plate via a protruded dot and notch connection.

In another embodiment, a surface of the second partition plate facing the first partition plate has a notch and a surface of the another side of the third partition plate includes a protruded dot to be received and retained in the notch at a use position.

According to another aspect, an article storage device is provided in a central console in a vehicle. The article storage device comprises a housing having a storage space defined by a bottom and a plurality of sidewalls including a first sidewall and a second sidewall opposing the first sidewall; and a first partition plate having a fixed side and a free side. The first partition plate extends between the first and second sidewalls of the housing and are configured to be rotatably between an unfolded position and a folded position via a first pivot connected to a fixed side of the first partition plate. The first partition plate is substantially perpendicular to the bottom of the housing to divide the storage space into a plurality of compartments at the folded position, and is substantially parallel and adjacent to the bottom of the housing the folded position.

In one embodiment, the free side of the first partition plate is rotated along a first arc track located in a plane substantially parallel to the first sidewall and the second sidewall.

In another embodiment, the first arc track is disposed on the first sidewall and second sidewall of the housing, respectively. Each of the first sidewall and second sidewall further includes a first pivot hole adjacent to the bottom of the housing and configured to receive the first pivot. Each of the two ends of a free side of the first partition plate includes a projection toward the first sidewall and the second sidewall, respectively and configured to be slidable in the first arc track.

In another embodiment, the article storage device further includes a first fixed plate and a second fixed plate substantially parallel and adjacent to the first and second sidewalls, respectively. The first arc track is disposed on the first and second fixed plate respectively. Each of the first and second fixed plates further includes a first pivot hole adjacent to the bottom of the housing and configured to receive the first pivot adjacent to the bottom of the housing, Each of the two ends of a free side of the first partition plate includes a projection toward the first fixed plate and the second plate, respectively and configured to be slidable in the first arc track.

In another embodiment, the first arc track has a first end adjacent to a top of the storage space and the first fixed plates includes a first recess positioned under and connected to the first end of the first arc track, and a second recess positioned under and connected to the first pivot hole. The first pivot is positioned in the second recess and the projection is positioned at the first recess at the unfolded position. When the first partition plate is lifted by a force at the unfolded position, the projection is moved away from the first recess to enter the first end of the first arc track and the first pivot is moved up from the second recess to be in the first pivot hole so that the first partition plate is slidable in the first arc track and moveable to the folded.

In another embodiment, the article storage device further includes a second partition plate disposed substantially parallel to the first partition plate and a second arc disposed on the first and second fixed plate, respectively.

In another embodiment, the article storage device further includes a third partition plate having a first side and a second side. The first side is pivotably connected to the first partition plate and the second side is moveable at a use position and a non-use position. The third partition plate is substantially perpendicular to the first and second partition plates at the use position.

In another embodiment, the first, second and third partition plates are preassembled with the first and second fixed plates.

In another embodiment, the first pivot is integrally formed with the first partition plate and the second pivot is integrally formed with the second partition plate.

According to yet another embodiment, an assembly is provided to adjust a storage pattern in an article storage device. The assembly comprises a first fixed plate, a second fixed plate parallel each other and configured to be connected to sidewalls of the article storage device and a first partition plate extending in the first and second fixed plate. Each of the fixed plates includes a first arc track on its surface and having a first end and a second end below the first end, and a first pivot hole under the second end. The first partition plate having a fixed side and a free side. Each of two end of a free side of the first partition plate includes a projection toward the first fixed plate and the second fixed plate, respectively and configured to be slidable in the first arc track and wherein the fixed side includes a first pivot. The first pivot of the first partition plate is configured to be received in the first pivot hole of the first and second fixed plates and the projections of the first partition plate are configured to be received in the first end of the first and second fixed plates such that the first partition plate is rotatable along the first arc track between a folded position and an unfolded position. The first partition plate is substantially perpendicular to a bottom of the article storage device to form a plurality of compartments at the unfolded position, and the first partition plate is substantially parallel to the bottom of the article storage device at the folded position.

In one embodiment, the assembly further includes a second partition plate and a third partition plate. Each of the fixed plates includes a second arc track on its surface and having a first end and a second end below the first end, and a second pivot hole under the second end. The second partition plate includes a fixed side having a second pivot and a free side, each of two ends of the free side of the second partition plate include a projection toward the first fixed plate and the second fixed plate, respectively and configured to be slidable in the second arc track via the second pivot. The second pivot is configured to be received in the second pivot hole of the first and second fixed plates and the projections of the second partition plate are configured to be received in the first end of the second arc track such that the second partition plate is rotatable along the second arc track. The third partition plate includes a first side and a second side, the first side is pivotably connected to the first partition plate and the second side is moveable at a use position and a non-use position. The third partition plate is substantially perpendicular to the first and second partition plates at the use position.

The article storage device or the assembly in the storage device of the present disclosure can divide the integrated storage space into a plurality of compartments via one or more partition plate pivotably connected to a housing of the storage device. At an unfolded position of the partition plate, the plurality of compartments are available. At the folded position of the all partition plates, the entire space in the house is available. The switching between the different storage patterns is simple and fast because it can be achieved by the rotation of the partition plate and there is no need to take the partition plates out from the storage space.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed article storage devices will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various article storage devices are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature or example.

Figure 1:
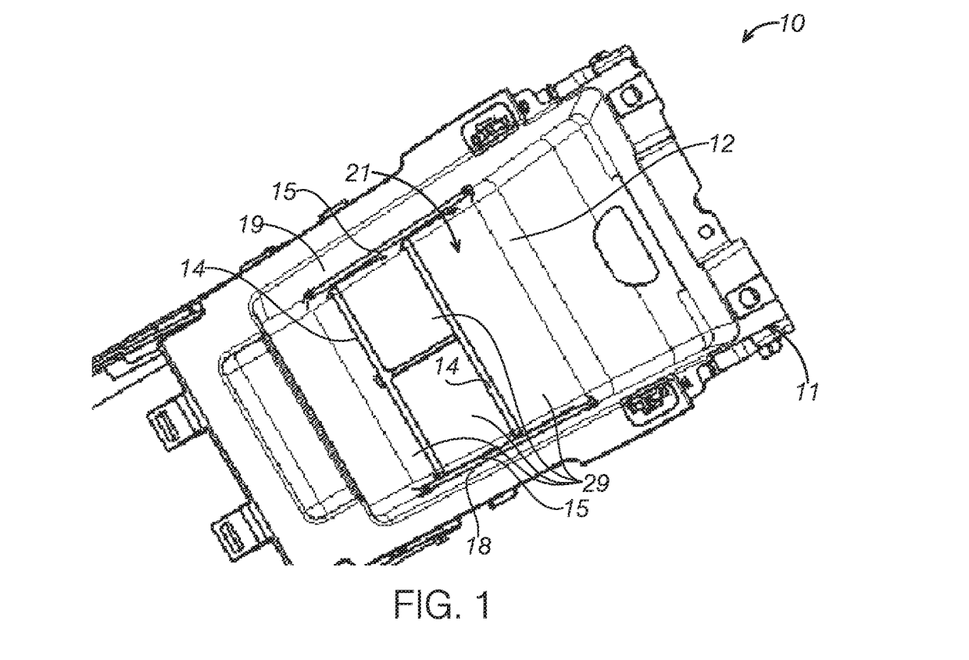
FIG. 1 is a perspective view of an article storage device according to one embodiment of the present disclosure, illustrating partition plates at an unfolded position.
Figure 2:
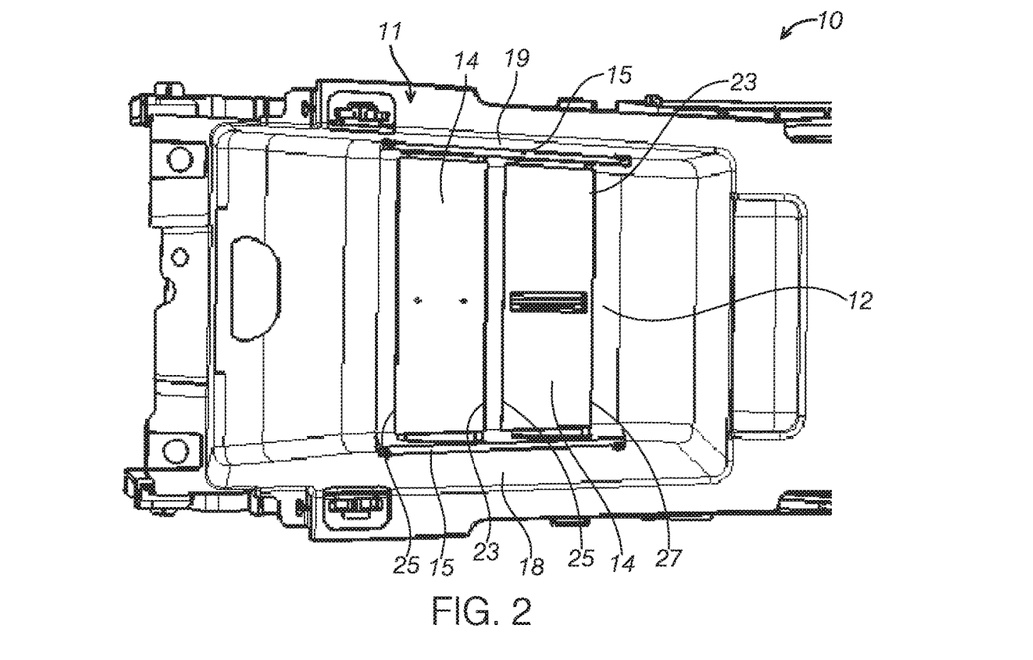
FIG. 2 is a perspective view of the article storage device in FIG. 1, illustrating the partition plates at a folded position.
Figure 3:
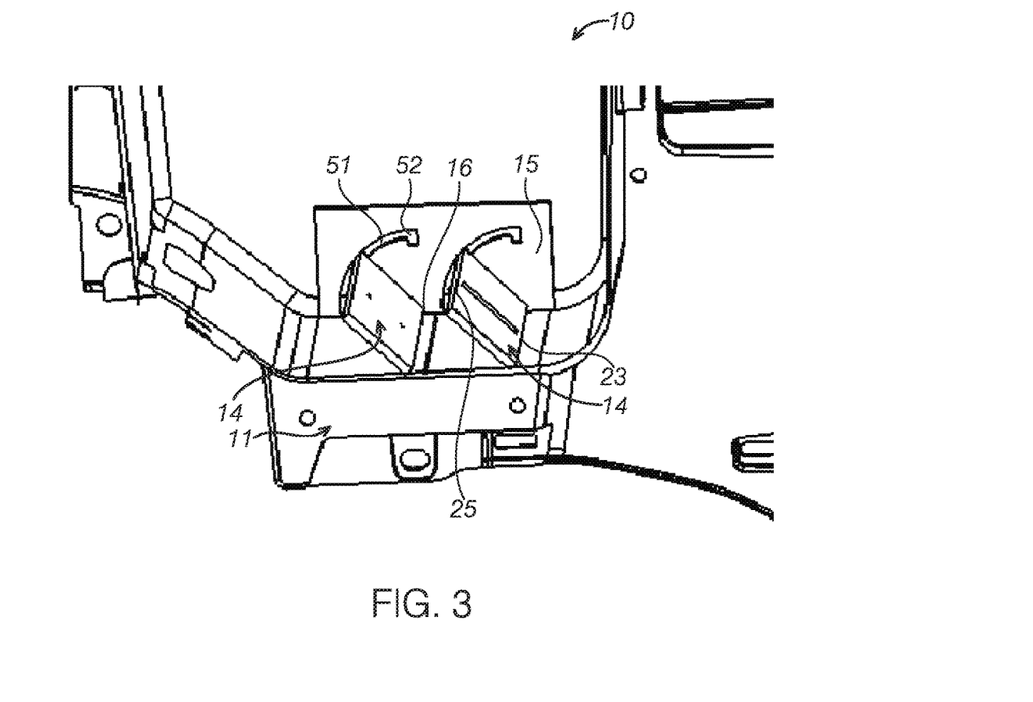
FIG. 3 is a perspective view of the article storage device in FIG. 1, illustrating the partition plates in a middle position between the unfolded position and the folded position.

Referring to FIGS. 1-3, an article storage device 10 according to one embodiment of the present disclosure is illustrated. In some embodiments, the article storage device 10 may be included in a central console in a vehicle as shown in FIG. 1. The article storage device 10 comprises a housing 11, an integral storage space 21 defined by a plurality of sidewalls and a bottom 12 of the housing 11 and one or more partition plates 14. The partition plate 14 extends between a first sidewall 18 and a second sidewall 19 of the housing 11 and includes a fixed side 23 and a free side 25. The fixed side 23 refers to the side that is adjacent to the bottom 12 of the housing 11 regardless whether the partition plate 14 is at a use position or a non-use position. It should be appreciated that the article storage device 10 may have a plurality of use positions depending on a number of the partition plates 14 and the position of the partition plates 14 in the housing 11. For example, in some embodiments, the partition plate includes a first partition plate 401 and a second partition plate 402. When the first partition plate 401 is at the unfolded position while the second partition plate is at the folded position, a first use position or one storage pattern is created. When both the first and second partition plates 401, 402 are at the unfolded position, a second use position or a second storage pattern is created. When both the first and second partition plates 401, 402 are at the folded position, a third use position or a third storage pattern is created.

The partition plate 14 is rotatably or pivotably coupled to the first and second sidewalls 18, 19 of the housing 11 and pivoted around a pivot 16 at the fixed side 23 such that it is moveable between an unfolded position or a use position shown in FIG. 1 and a folded position or a non-use position shown in FIG. 2. The coupling refers that the partition plate 14 is directly connected to the first and second sidewalls 18, 19 or indirectly connected to the first and second sidewalls via other components such as fixed plates as described in detail below. The unfolded position or the use position refers to a position at which the partition plate 14 is substantially perpendicular to the bottom 12 of the housing 11 or substantially parallel to the first and second sidewalls 18, 19 or a final unfolded position where further movement in one direction is restricted. The folded position or the non-use refers to a position at which the partition plate is substantially parallel to the bottom 12 or contacts the bottom 12. FIG. 1 shows that the partition plate 14 is at the unfolded position which divides the integrated storage space 21 into a plurality of compartments 29.

The partition plate 14 or a main surface of the partition plate 14 may have an angle with the bottom 12 of the housing 11. For example, the partition plate 14 is substantially perpendicular to the bottom 12 at the unfolded position or the use position. Each of the compartments 29 divided by the partition plates 14 are separate and defined by the bottom 12, the partition plates 14 and the sidewalls of the housing 11. In other words, a depth of the divided compartments 29 is the same as a depth of the integral storage space 21. When there is no need for the divided compartments, the partition plates 14 are folded back to the bottom 12 of the housing 11 to be substantially parallel to the bottom 12 to enable to store articles with a larger volume. When the compartments are needed to store different articles, the partition plates 14 can be unfolded quickly by simply rotating the partition plates 14 without the need to withdraw the partition plates 14 from the storage space first. In this way, it is easy and convenient for a user to adjust the storage room pattern.

In some embodiments, one of the first sidewall 18 and the second sidewall 19 may include a pivot hole 17 at the bottom and the pivot hole 17 is configured to receive a pivot 16 connected to a bottom of the partition plate 14. The first sidewall 18 and/or the second sidewall 19 may include an arc track 51 having a center at the pivot hole 17. A fixed side 23 of the partition plates 14 is fixed on the pivot 16 and two ends of the free end 25 of the partition plates 14 is slidably connected to the first sidewall 18 and/or the second sidewall 19 along the arc track 51.

Figure 4:
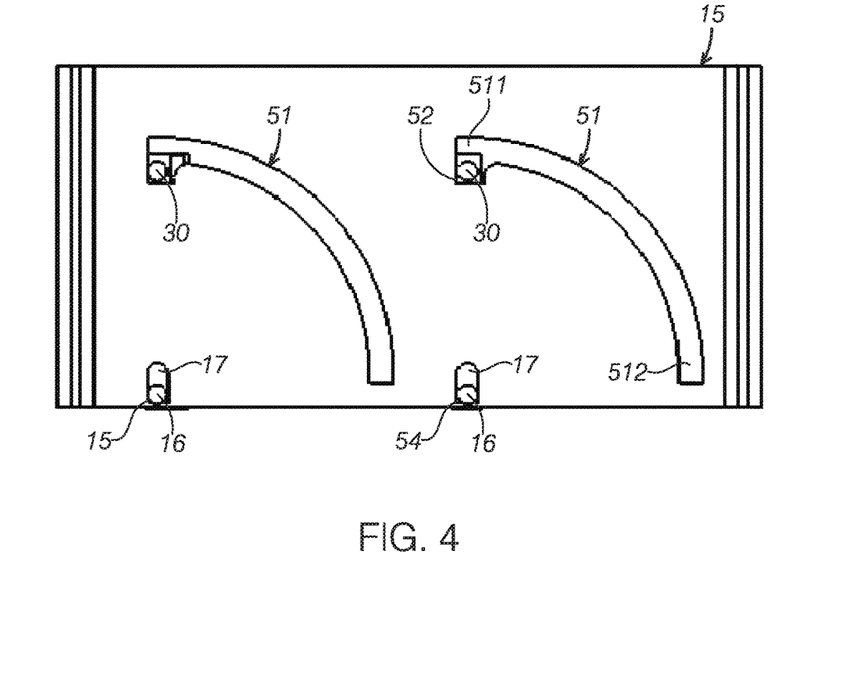
FIG. 4 is a side view of a sidewall or a fixed plate of the article storage device according to one embodiment of the present disclosure.

In some embodiments as shown in FIGS. 1 and 3, the article storage device 10 further includes a plurality of fixed plates 15 detachably connected to the first and second sidewalls 18, 19 of the housing 11. In the depicted embodiment, two fixed plates 15 are included. The fixed plates 15 are secured on the sidewalls 18, 19 and substantially parallel with the first and second sidewall 18, 19. The partition plate 14 extends between two opposing fixed plates 15 and is substantially perpendicular with the bottom 12 of the housing 11 to divide the storage space 21 into a plurality of compartments 29 at the unfolded position. Referring to FIG. 4, a pivot hole 17 may be disposed on the bottom of the fixed plate 15 to receive a pivot 16 connected a fixed side 23 of the partition plate 14. An arc track 51 with a center at the pivot hole 17 may be disposed on the fixed plates 15.

With further reference to FIGS. 1-3, The partition plate 14 has the fixed side 23 and the free side 25. The fixed side 23 of the partition plate 4 is connected to the pivot 16. In some embodiments, the pivot 16 may be integrally formed. For example, the pivot 16 and the partition plate 14 may be integrally formed via welding. In another example, the pivot 16 may be formed at the fixed side 23 with two protrusions at two opposite ends of the fixed side 23 in an injection molding and the two protrusions are configured to be received in the pivot hole 17. Two ends of the free side 25 each may include a projection toward the fixed plates 15 or the sidewalls of the housing and configured to be slidable in the arc track.

Referring to FIG. 4, the pivot hole 17 is formed at a bottom portion of the fixed plate 15 to receive the pivot 16. The arc track 51 in the fixed plate 15 may be a part of a circle having a center at the pivot hole 17. The arc track 51 has a first end 511 adjacent to a top of the fixed plate 15 and a second end 512 opposite to the first end 511 at another end of the arc track 51 The fixed plate 15 may further include a first recess 52 positioned under the first end 511, extending down along a radial direction and being connected with the first end 511, and a second recess 54 positioned under the first pivot hole 17, extending down at same direction as the first recess 52 and being connected with first pivot hole 17. The partition plate 14 is pivotable between the folded position as shown in FIG. 2 and the unfolded position as shown in FIG. 1. At the folded position, the projections 30 at the two ends of the free side 25 of the partition plate 14 are positioned at the second end 512 of the arc track 51 and the pivots 16 at the fixed end 23 are positioned at the second recess 54 or the pivot hole 17. When the partition plate 14 is pivoted from the folded position to the unfolded position, the projections 30 of the two ends of free side 25 of the partition plate 14 slide along the arc track 51 until the projections 30 reach the first end 511 of the arc track. At the unfolded position, the projections 30 of the two ends of free side 25 of the partition plate 14 fall from the first end 511 of the arc track 51 and reside in the first recess 52 due to the gravity, while the pivots 16 fall from the pivot hole 17 and resides in the second recess 54 such that further movement of the partition plates 14 relative to the fixed plates 15 is prevented at the unfolded position or at the use position. When the partition plate 14 needs to be pivoted from the unfolded position to the folded position, the partition plate 14 can be lifted by a force so that the two ends of the free side 25 of the partition plate 14 are moved away from the first recess 52 and enter the first end 511 of the arc track 51, and the pivot 16 is moved up from the second recess 54 and positioned in the pivot hole 17 such that the projections 30 from two ends of the free side 25 of the partition plate 14 are able to slide from the first end 511 to the second end 512 along the arc track 51 to the folded position. At the folded position, the partition plate 14 is substantially parallel to the bottom 12 of the housing 11. At the unfolded position, the partition plate 14 divides the integrated storage space 21 into a plurality of compartments 29. FIG. 1 shows the article storage device 10 having the partition plates 14 at the unfolded position, FIG. 2 shows the article storage device 10 having the partition plates 14 at the folded position and FIG. 3 shows that the article storage device 10 having the partition plates 14 at a middle position between the unfolded position and the folded position.

Figure 5:
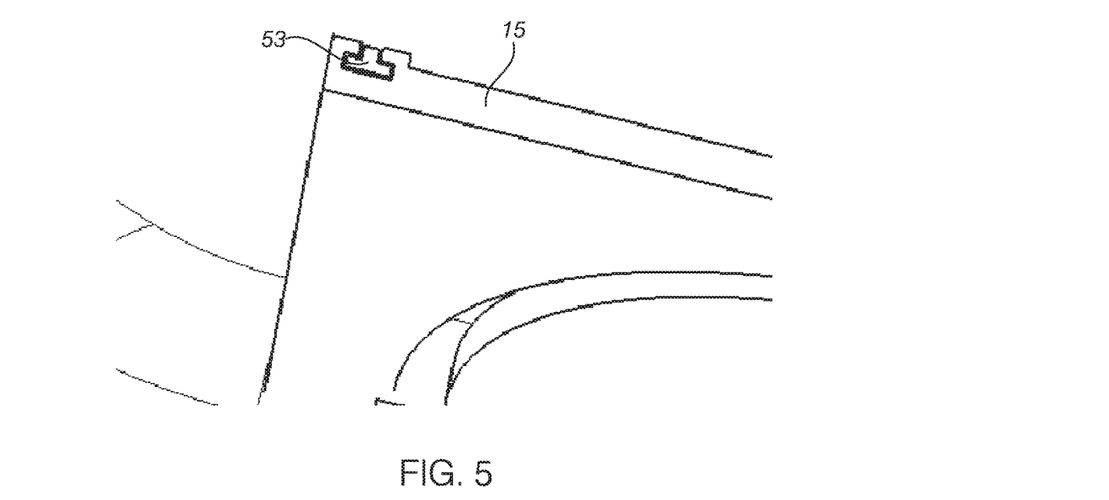
FIG. 5 is a partial view of an article storage device according to one embodiment of the present disclosure.

Referring to FIG. 5, the fixed plates 15 may include a vertical groove 53 along its height, and one of the sidewalls 18, 19 may include a protrusion configured to be coupled with the vertical groove 53. It should be appreciated that the protrusion and the groove can be in any suitable shapes. With the detachable design, the fixed plates 15 and the partition plates 14 can be assembled and disassembled from the housing 11 as an integral piece for easy replacement or cleaning up. In some embodiments, the fixed plates 15 and the partition plate 14 may be preassembled together and then placed into the housing 11.

The article storage device 10 may include a plurality of partition plates 14. In the depicted embodiments, the article storage device 10 includes two partition plates 14 parallel to each other and extending between the two opposition sidewalls 18, 19 or the fixed plates 51. It should be appreciated that more than two parallel partition plates 14 may be included. Further, an additional partition plate that is substantially perpendicular to the partition plates 14 at a use position may be included. For example, referring to FIG. 6, an article storage device may include a first partition plate 401 and a second partition plate 402 parallel each other and spaced apart, and a third partition plate 403 detachably connected between the first partition plate 401 and the second partition plate 402. The third partition plate 403 has a first side 44 and a second side 46. The first side 44 is connected to the first partition plate 401 via a pivot 43, and the second side 46 is detachably connected to the second partition plate 402 via a protruded dot (not showing) and a notch. A surface of the second partition plate 402 may include at least one notch 45, and a surface the second side 46 of the third partition plate 403 may include at least one protruded dot. The protruded dot is received and retained in the notch 45 when the second side 46 of the third partition plate 403 is rotated to the second partition plate 402. In some embodiments, the third partition plate 403 may be connected to a middle portion of the first and second partition plates 401 and 402. As the third partition plate 403 is secured on the second partition plate 402 via the protrude dot and notch connection, the third partition plate 403 can be assembled or disassembled with a gentle inertia, which makes the article storage device convenient to use. In some embodiments, the third partition plate 403 may be connected to the second partition plate 402 via other connection structures.

In the depicted embodiments, the partition plate 14 is connected to the arc track 51, and pivoted via the pivot 16 to rotate along the arc track 51. FIG. 4 shows that the two ends of the free side 25 of the partition plates 401, 402 are positioned in the first recess 52 at the unfolded position. The two ends of the free side 25 may be formed as sliding blocks to be received in the first recess 52. Further, the two ends may be configured to include a projection 30 with a circular cross section and slidable in the arc track 51.

It should be appreciated that the partition plates may be pivoted connected with the first and second sidewalls 18, 19 directly without the fixed plates 14. For example, one of the first and second sidewalls 18, 19 may include arc tracks corresponding to the partition plates 14. The partition plates 14 may be pivotably connected with the sidewalls 18, 19 via any suitable approaches such as the pivot/pivot hole connection and/or slidable connection via track as described above.

Figure 6:
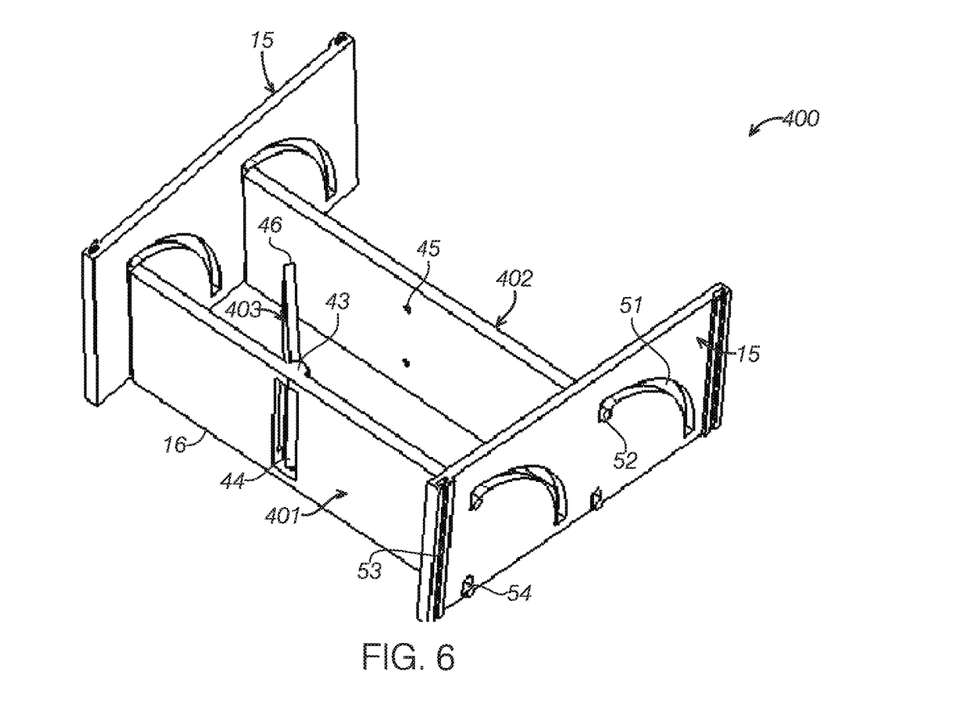
FIG. 6 is a perspective view of an assembly to adjust a storage pattern in an article storage device according to one embodiment of the present disclosure, illustrating the partition plates at one use position.
Figure 7:
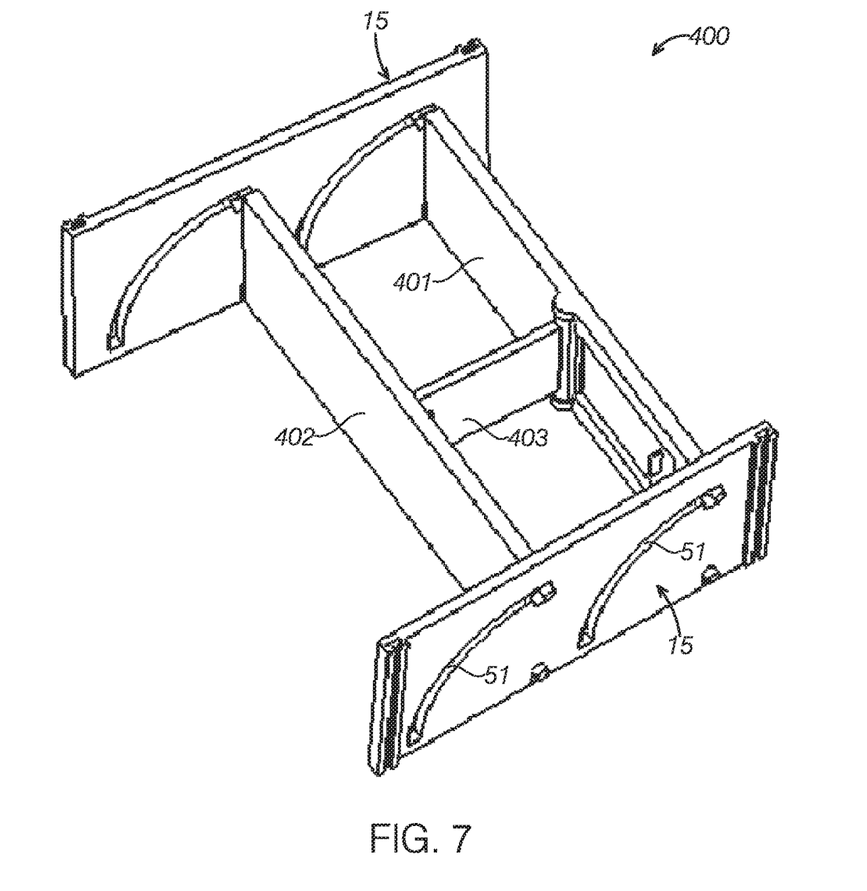
FIG. 7 is a perspective view of the assembly in FIG. 6, illustrating the partition plates at another use position.

FIGS. 6 and 7 show a perspective view of an assembly 400 to adjust a storage pattern of an article storage device. The assembly 400 includes fixed plates 15 and a plurality of partition plates to provide different compartment configurations or the storage pattern. In the depicted embodiments, the assembly 400 includes the partition plates 401, 402, and 403. The first and second partition plates 401 and 402 are pivotably connected to the fixed plates 15 by any appropriate approaches such as the pivot and sliding track connection as described above. The third partition plate 403 is pivotably connected to one of the first and second partition plates 401 and 403. For example, the first side 44 of the third partition plate 403 is pivotably connected on the first partition plate 401, and the second side 46 is detachably connected to the second partition plate 402 via protruded dots and the recesses. FIG. 6 illustrates the third partition plate 403 in a middle position between its use and non-use position. FIG. 7 illustrates the third partition plate 403 at the use position. The protruded dots on the third partition plate 403 are received in the recesses 45 on the second partition plate 402 to connect the third partition plate 403 and the second partition plate 402. FIG. 7 shows that the plurality of the partition plates divide one integrated storage space into four compartments. It should be appreciated that the assembly of the present disclosure can divide the integrated storage space into multiple compartments or multiple storage patterns by employing different partition plates and adjusting the partition plates at different positions.

The article storage device of the present disclosure is convenient to sort the items and to adjust the storage pattern easily. In the embodiments depicted in FIGS. 1 to 7, the article storage device includes a first partition plate 401, a second partition plate 402 parallel to the first partition plate 401, and a third partition plate 403 disposed between the first and second partition plates 401, 402. In other embodiments, the number the partition plates may be configured based on the function and the use of the article storage device. The number and the layout of the partition plate in the storage device are not limited. The use of one, two, three partition plates individually or in combination can create different configurations of the storage compartments.

According to another aspect of the present disclosure, a vehicle is provided. The vehicle includes the article storage device as described above. The article storage device includes a storage bin under an armrest of a central console. With the convenience and the easy adjustment of the storage compartment of the article storage device, the user experience for the vehicle is improved as well. In other embodiments, the storage device may be used in other places of the vehicle, such as in a trunk or a place outside the vehicle.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

The invention claimed is:

1. An article storage device in a vehicle, comprising:
a housing including a plurality of sidewalls;
two fixed plates detachably connected to two opposing sidewalls of the housing, each of the fixed plates includes a pivot hole and an arc track with a center at the pivot hole, and
a partition plate extending between the two fixed plates, wherein the partition plate has a fixed side and a free side, and each of two ends of the fixed side includes a pivot,
wherein each pivot hole of the two fixed plates is configured to receive the pivot on the partition plate, the fixed side of the partition plate is connected to the two fixed plates via the pivot, and two ends of the free side of the partition plate are slidably connected to the two fixed plates via the arc track.

2. The article storage device of claim 1, wherein one of the two opposing sidewalls includes a protrusion toward the storage space, and each of the fixed plates includes a vertical groove corresponding to the protrusion, and wherein the two fixed plates are connected to the two opposing sidewalls when the protrusion is received in the vertical groove.

3. The article storage device of claim 1, wherein the arc track has a first end adjacent to a top of the storage space and wherein each of the fixed plates includes a first recess positioned under the first end and connected with the first end and a second recess positioned under the pivot hole and connected with the pivot hole.

4. The article storage device of claim 1, wherein the partition plate includes a first partition plate and a second partition plate parallel and spaced apart each other and a third partition plate detachably connected to the first and second partition plates.

5. The article storage device of claim 4, wherein one side of the third partition plate is pivotably connected to the first partition plate, and another opposite side is detachably connected to the second partition plate via a protruded dot and notch connection.

6. The article storage device of claim 5, wherein a surface of the second partition plate facing the first partition plate has a notch and a surface of another side of the third partition plate includes a protruded dot to be received and retained in the notch at a use position.

7. An article storage device in a central console in a vehicle, comprising:
a housing having a storage space defined by a bottom and a plurality of sidewalls including a first sidewall and a second sidewall opposing the first sidewall; and
a first partition plate having a fixed side and a free side, wherein the first partition plate is configured to be rotatably rotatable between an unfolded position and a folded position via a first pivot connected to the fixed side of the first partition plate; and
a first fixed plate and a second fixed plate parallel and adjacent to the first and second sidewalls, respectively, wherein each of the first and second fixed plates includes a first arc track on its surface, and a first pivot hole adjacent to the bottom of the housing and configured to receive the first pivot,
wherein the first partition plate extends between the first and second fixed plates, each first pivot hole of the first and second fixed plates is configured to receive the first pivot connected to the first partition plate, the fixed side of the partition plate is connected to the first and second fixed plates via the first pivot, and two ends of the free side of the partition plate are slidably connected to the first and second fixed plates via the first arc track,
wherein the first partition plate is perpendicular to the bottom of the housing to divide the storage space into a plurality of compartments at the unfolded position, and wherein the first partition plate is parallel and adjacent to the bottom of the housing at the folded position.

8. The article storage device of claim 7, wherein the two ends of the free side of the first partition plate include a projection toward the first fixed plate and the second fixed plate, respectively, and configured to be slidable in the first arc track.

9. The article storage device of claim 8, wherein the first arc track has a first end adjacent to a top of the storage space and the first fixed plates includes a first recess positioned under and connected to the first end of the first arc track, and a second recess positioned under and connected to the first pivot hole,
wherein the first pivot is positioned in the second recess and the projection is positioned at the first recess at the unfolded position,
wherein, when the first partition plate is lifted by a force at the unfolded position, the projection is moved up from the first recess to enter the first end of the first arc track and the first pivot is moved up from the second recess to be in the first pivot hole so that the first partition plate is slidable in the first arc track and moveable to the folded position.

10. The article storage device of claim 9, further comprising a second partition plate disposed parallel to the first partition plate, wherein each of the first and second fixed plates, includes a second arc track.

11. The article storage device of claim 10, wherein the first pivot is integrally formed with the first partition plate and the second pivot is integrally formed with the second partition plate.

12. The article storage device of claim 10, further includes a third partition plate having a first side and a second side, wherein the first side is pivotably connected to the first partition plate and the second side is moveable at a use position and a non-use position, and wherein the third partition plate is perpendicular to the first and second partition plates at the use position.

13. The article storage device of claim 12, wherein the first, second and third partition plates are preassembled with the first and second fixed plates.

14. An assembly to adjust a storage pattern in an article storage device, comprising:
    a first fixed plate and a second fixed plate parallel each other and configured to be connected to sidewalls of the article storage device and parallel to the sidewalls, wherein each of the fixed plates includes a first arc track on its surface and having a first end and a second end below the first end, and a first pivot hole under the second end;
    a first partition plate having a fixed side and a free side, and extending between the first and second fixed plates, wherein two ends of a free side of the first partition plate include a projection toward the first fixed plate and the second fixed plate, respectively and configured to be slidable in the first arc track and wherein the fixed side includes a first pivot,
    wherein the first pivot of the first partition plate is configured to be received in the first pivot hole of the first and second fixed plates and the projections of the first partition plate are configured to be received in the first end of the first and second fixed plates such that the first partition plate is rotatable along the first arc track between a folded position and an unfolded position, and
    wherein the first partition plate is perpendicular to a bottom of the article storage device to form a plurality of compartments at the unfolded position, and wherein the first partition plate is parallel to the bottom of the article storage device at the folded position.

15. The assembly of the claim 14, further includes a second partition plate and a third partition plate,
    wherein each of the first and second fixed plates includes a second arc track on its surface and having a first end and a second end below the first end, and a second pivot hole under the second end,
    wherein the second partition plate includes a fixed side having a second pivot and a free side, two ends of the free side of the second partition plate includes a projection toward the first fixed plate and the second fixed plate, respectively and configured to be slidable in the second arc track via the second pivot, where the second pivot is configured to be received in the second pivot hole of the first and second fixed plates and the projections of the second partition plate are configured to be received in the first end of second arc track such that the second partition plate is rotatable along the second arc track, and
    wherein the third partition plate includes a first side and a second side opposite to the first sides, the first side is pivotably connected to the first partition plate and the second side is moveable at a use position and a non-use position, and wherein the third partition plate is perpendicular to the first and second partition plates at the use position.

* * * * *